(12) United States Patent
Aijima et al.

(10) Patent No.: US 9,435,397 B2
(45) Date of Patent: Sep. 6, 2016

(54) TORSIONAL VIBRATION DAMPING DEVICE

(71) Applicant: TOYOTA JIDOSHA KABUSHIKI KAISHA, Toyota-shi (JP)

(72) Inventors: Shingo Aijima, Toyota (JP); Yu Miyahara, Toyota (JP); Fusahiro Tsukano, Toyota (JP); Hiroyuki Amano, Toyota (JP); Hirotsugu Yoshino, Toyota (JP); Tadashi Sekiguchi, Toyota (JP); Syuhei Horita, Toyota (JP); Naoyuki Kishimoto, Toyota (JP); Yoshihiro Miyamachi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/438,508

(22) PCT Filed: Nov. 1, 2012

(86) PCT No.: PCT/JP2012/078344
§ 371 (c)(1),
(2) Date: Apr. 24, 2015

(87) PCT Pub. No.: WO2014/068750
PCT Pub. Date: May 8, 2014

(65) Prior Publication Data
US 2015/0276014 A1   Oct. 1, 2015

(51) Int. Cl.
*F16F 15/14* (2006.01)
*F16H 57/04* (2010.01)

(52) U.S. Cl.
CPC ......... *F16F 15/145* (2013.01); *F16H 57/0402* (2013.01); *Y10T 74/2121* (2015.01)

(58) Field of Classification Search
CPC ...... F16F 15/145; F16F 15/163; F16F 15/16; F16F 15/162; F16F 15/165; F16H 57/0404; F16H 57/0402; Y10T 74/2121; Y10T 74/2128

See application file for complete search history.

(56) References Cited

U.S. PATENT DOCUMENTS

| 5,370,580 | A | * | 12/1994 | Vollet | .................... | F16F 15/161 464/24 |
| 8,493,063 | B2 | * | 7/2013 | Guibet | .................... | B03C 1/286 324/207.13 |

(Continued)

FOREIGN PATENT DOCUMENTS

| DE | 198 31 154 A1 | 1/2000 | |
| DE | EP 0972965 A1 * | 1/2000 | .......... F16F 15/1435 |

(Continued)

OTHER PUBLICATIONS

Machine translation of JP 2000-2987843 A obtained on Jan. 6, 2016.*

(Continued)

*Primary Examiner* — Adam D Rogers
(74) *Attorney, Agent, or Firm* — Oblon, McClelland, Maier & Neustadt, L.L.P.

(57) ABSTRACT

The present invention relates to a torsional vibration damping device in which a contact site with an inertial mass can be lubricated effectively while reducing resistance of the inertial mass to oscillate. The vibration damping device includes a rotary member that is rotated by a torque, and an inertial mass that is oscillated by torque pulses. The inertial mass is held in a chamber formed on the rotary member liquid-tightly together with lubrication oil while being allowed to be oscillated by torque pulses in the rotational direction of the rotary member. An amount of the lubrication oil is adjusted in a manner such that the inertial mass will not be brought into contact with an oil film of the lubrication oil centrifugally adhering to a radially outer section of an inner face of the chamber.

11 Claims, 11 Drawing Sheets

(56) References Cited

U.S. PATENT DOCUMENTS

| | | | |
|---|---|---|---|
| 8,518,248 B2* | 8/2013 | Ishii | F16H 57/0402 123/196 A |
| 2010/0242466 A1 | 9/2010 | Krause et al. | |
| 2015/0005078 A1* | 1/2015 | Sekiguchi | F16H 45/02 464/24 |

FOREIGN PATENT DOCUMENTS

| | | | | |
|---|---|---|---|---|
| DE | 199 54 272 A1 | 5/2001 | | |
| GB | 2 354 055 A | 3/2001 | | |
| JP | 2000297843 A * | 10/2000 | | |
| JP | 2001 153185 | 6/2001 | | |
| JP | 2002 340097 | 11/2002 | | |
| JP | 2011 504987 | 2/2011 | | |
| JP | WO 2012049762 A1 * | 4/2012 | | F16F 15/145 |

OTHER PUBLICATIONS

International Search Report Issued Nov. 27, 2012 in PCT/JP2012/078344 Filed Nov. 1, 2012.

* cited by examiner

TORSIONAL VIBRATION DAMPING DEVICE

TECHNICAL FIELD

The present invention relates to a device for damping torsional vibrations of a rotary member such as a crankshaft and a power transmission shaft, and more particularly, to a device for damping torsional vibrations utilizing oscillating motion of a rolling mass.

BACKGROUND ART

For instance, a device for suppressing resonance by an oscillating motion of an inertial mass is described in Japanese Patent Laid-Open No. 2002-340097. In a device taught by Japanese Patent Laid-Open No. 2002-340097, a pendulum mass is pivotally fixed to a radially outer side of a pulley by a pin, and a natural frequency of the pendulum mass governed by a distance between the pin and a gravity center thereof is adjusted to a number of torque pulses per rotation. The pendulum mass is oscillated by the torque pulse of the pulley as long as the pulley is rotated, and hence the pin and a pin hole are always subjected to high friction. In order to ease such friction between the hole and the pin, an inner surface of a pin hole is covered with a fluorocarbon resin film.

In turn, Japanese Patent Laid-Open No. 2011-504987 describes a force transmission device in which a torque converter is provided with a rotational speed adaptive absorber comprising a disk shaped rotary member rotated by torque, and an inertial mass attached to a radially outer side of the rotary member while being allowed to oscillate. The rotational speed adaptive absorber of this kind is immersed in the oil so that a friction site can be lubricated to reduce the abrasion thereof. However, a resistance of oscillating motion of the inertial mass is increased by the oil. According to the teachings of Japanese Patent Laid-Open No. 2011-504987, therefore, the rotational speed adaptive absorber is designed taking account of such oil resistance.

Japanese Patent Laid-Open 2001-153185 also describes a dynamic damper in which a friction site between a rolling inertial mass and an inner surface of a chamber housing the rolling mass is lubricated by oil. The dynamic damper taught by Japanese Patent Laid-Open 2001-153185 is used to damp a vibration of a crankshaft of the engine. For this application, a plurality of chambers are formed in a rotary disk fitted onto a crankshaft, and a radially outer section of an inner surface of the chamber serves as a raceway surface. When the hub is rotated together with the crank shaft, the mass held in the chamber is centrifugally pushed onto the raceway surface. In this situation, the mass is oscillated on the raceway surface by torque pulses applied to the crankshaft and the disk at a frequency of pulsation. According to the teachings of Japanese Patent Laid-Open 2001-153185, an oil hole is formed in the chamber to introduce oil in a crank chamber to lubricate a friction site between the inner surface of the chamber and the mass.

Thus, in a device for damping vibrations by oscillating the mass at a frequency of pulsation, a friction at the friction site between the mass and a contact portion has to be eased. To this end, given that the fluorocarbon resin coat is applied, abrasions at the friction site may be reduced. However, an additional work for forming the coating is required during a manufacturing process, and a number of components of the vibration damping device has to be increased.

Instead, according to the teachings of Japanese Patent Laid-Open No. 2011-504987 and Japanese Patent Laid-Open 2001-153185, oil is used to lubricate the friction site. In those cases, however, the inertial mass or the rolling mass has to be immersed into the oil and hence a resistance of the oscillating motion is increased by the oil. For this reason, the mass may not be allowed to be oscillated at desired frequency. As described, according to the teachings of Japanese Patent Laid-Open No. 2011-504987, the oscillating frequency of the rotational speed adaptive absorber is adjusted taking account of effects of oil. However, a viscosity of oil changes significantly depending on a temperature, and the effects of oil are changed depending on an amount of oil. Therefore, it is rather difficult to keep oscillating the mass at the desired frequency.

SUMMARY OF INVENTION

The present invention has been conceived noting the foregoing technical problems, and it is therefore an object of the present invention is to provide a torsional vibration damping device excellent in abrasion resistance and durability whose vibration damping characteristics can be tuned and maintained easily.

The torsional vibration damping device according to the present invention comprises a rotary member that is rotated by a torque, and an inertial mass that is arranged on a radially outer portion of the rotary member while being allowed to be oscillated by torque pulses in a rotational direction of the rotary member. In order to achieve the above-explained objectives, according to the present invention, the torsional vibration damping device is provided with a chamber that is formed on the rotary member to hold the inertial mass liquid-tightly in a manner to allow the inertial mass to oscillate in the rotational direction of the rotary member, and a lubrication oil encapsulated in the chamber. An amount of the lubrication oil is adjusted in a manner such that the inertial mass will not be brought into contact with an oil film of the lubrication oil centrifugally adhering to a radially outer section of an inner face of the chamber.

According to another aspect of the present invention, the torsional vibration damping device also comprises: a rotary member that is rotated by a torque; an inertial mass that is arranged on a radially outer portion of the rotary member while being allowed to be oscillated by torque pulses in a rotational direction of the rotary member; a chamber that is formed on the rotary member to hold the inertial mass liquid-tightly in a manner to allow the inertial mass to oscillate in the rotational direction of the rotary member; and a lubrication oil encapsulated in the chamber. According to another aspect of the present invention, an oscillating path of the inertial mass is adjusted in a manner such that the rolling member oscillated by torque pulses will not come into contact with an oil film of the lubrication oil centrifugally adhering to a radially outer section of an inner face of the chamber throughout an entire path of oscillation.

In the torsional vibration damping device an oil reservoir into which the lubrication oil is introduced may be arranged on a radially outer side of the chamber while opening toward the chamber.

For example, the oil reservoir may also be arranged radially outer side of the rotary member in the chamber.

Alternatively, the oil reservoir may also be formed by projecting an outer circumferential portion of the chamber in an axial direction of the rotary member.

The torsional vibration damping device further comprises a foreign matter capturing member adapted to capture foreign matter contained in the lubrication oil that is arranged at a site where the lubrication oil comes into contact therewith.

For example, a magnet for capturing magnetic metal powder may be used as the foreign matter capturing member.

Instead, a strainer adapted to capture solid foreign matter contained in the lubrication oil flowing therethrough may also be used as the foreign matter capturing member.

Specifically, the inertial mass is a rolling member oscillated by the torque pulses. The torsional vibration damping device further comprises a guide member that is arranged in the chamber to guide the lubrication oil migrating radially inwardly from the radially outer section of the chamber to the raceway surface or to the rolling member.

In the torsional vibration damping device, a plurality of the inertial masses are arranged in the rotary member at predetermined intervals in a circumferential direction, therefore, the chamber is individually arranged to hold each of the inertial mass. Optionally, adjoining chambers may be connected to each other through a connection passage to allow the lubrication oil flowing therebetween.

Alternatively, the chamber may also be formed in a manner to hold the plurality of the inertial masses thus arranged in the rotary member at predetermined intervals in a circumferential direction.

According to the present invention, the inertial mass rotated together with the rotary member is oscillated in the circumferential direction by torque pulses exerted to the rotary member. Consequently, torsional vibrations of the rotary member are damped by such oscillating motion of the inertial mass. In this situation, the lubrication oil held in the chamber centrifugally adheres to an inner face of radially outer section of the chamber to form the oil film. A thickness (or a depth) of the oil film is governed by an amount of the lubrication oil encapsulated in the chamber. However, according to the present invention, the amount of the lubrication oil is adjusted in a manner such that the inertial mass is allowed to be oscillated without come into contact with the oil film or brought into contact only at some point in the oscillation path. That is, the inertial mass will not be immersed entirely into the lubrication oil in the course of oscillation. According to the present invention, therefore, resistance of the inertial mass to oscillate caused by the lubrication oil can be reduced so that the inertial mass is allowed to oscillate at the designed frequency. In addition, since inertial mass is not brought into contact with the lubrication oil, the vibration damping characteristics can be maintained precisely.

When the rotary member stops, the lubrication oil is concentrated at a bottom of the chamber so that the inertial mass can be immersed partially into the lubrication oil to be lubricated. The lubrication oil adhering to the inner face of the radially outer section of the chamber is agitated during increasing or decreasing a rotational speed of the rotary member while forming an oil film on the inertial mass and in the vicinity thereof. That is, the inner face of the chamber and other contact sites with the inertial mass can be lubricated. According to the present invention, therefore, the vibration damping characteristics of the torsional vibration damping device will not be changed frictionally, and the torsional vibration damping device can be prevented from being damaged.

The oil reservoir arranged on radially outer side of the chamber is adapted to reduce a thickness of the oil film centrifugally formed on the inner face of the chamber. According to present invention, therefore, the thickness of the oil film can be kept thinner even if an amount of the lubrication oil in the chamber is increased so that the inertial mass can be displaced radially outwardly to enhance an inertial torque for damping torsional vibrations.

In addition to the above-mentioned advantages, the foreign matter contained in the lubrication oil such as metal powder resulting from metal processing and abrasion powder generated during operation can be captured by the foreign matter capturing member such as the magnet and the strainer. According to the present invention, therefore, the inertial mass is allowed to be oscillated smoothly without causing abrasion at the contact site.

Further, the lubrication oil agitated by a change in a rotational speed of the rotary member can be guided by the guide member toward the inertial mass and the raceway surface so that the contact therebetween can be lubricated effectively.

Optionally, the amounts of the lubrication oil in the adjoining chambers can be averaged by providing a connection therebetween by the connection passage.

DESCRIPTION OF THE PREFERRED EMBODIMENT(S)

Next, preferred example of the torsional vibration damping device will be explained in more detail. Specifically, the torsional vibration damping device according to the preferred example is a dynamic damper adapted to damp torsional vibrations of a rotary member resulting from torque pulses by pendulum motion of an inertial mass. In order to counteract to such torque pulses, the inertial mass is allowed to pivot around a shaft or pin, or to oscillate along a raceway surface formed in the rotary member. For example, the former structure in which the inertial mass is pivotally fixed to the rotary member is described in Japanese Patent Laid-Open No. 2002-340097 and the Japanese Patent Laid-Open No. 2011-504987. The latter structure in which the inertial mass rolls on the raceway surface is disclosed in Japanese Patent Laid-Open 2001-153185.

Figure 1:
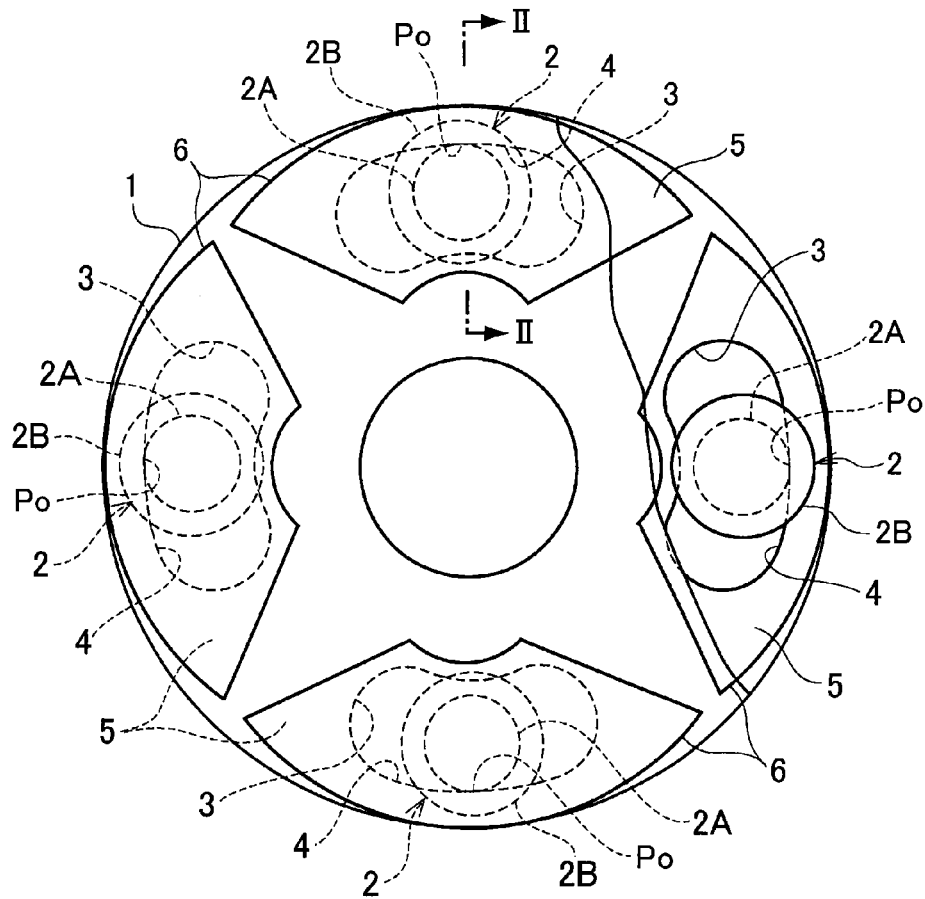
FIG. 1 is a fragmentary sectional view showing one example of the torsional vibration damping device.
Figure 2:
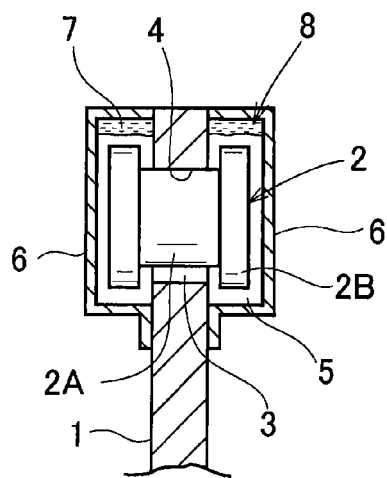
FIG. 2 is a sectional view along a line in FIG. 1.

The preferred examples to be explained relate to the dynamic damper configured to damp vibrations by an oscillating motion of the inertial mass along the raceway surface. Accordingly, the inertial mass will be called a rolling member in the following descriptions. Referring now to FIG. 1, there is shown one example of the vibration damping device according to the present invention. As illustrated in FIG. 1, a rotary member 1 is a disk-shaped member that is rotated integrally with a not shown crankshaft of an engine, a rotary shaft of a transmission, or a pump impeller or a turbine runner of a torque converter. A plurality of rolling members 2 are arranged on a radially outer side of the rotary member 1 at regular intervals in a circumferential direction (i.e., a rotational direction of the rotary member 1). As shown in FIG. 2, the rolling member 2 is comprised of a mass 2A slightly thicker than the rotary member 1 and a pair of diametrically larger disks 2B attached to both thickness ends of the mass 2A. Accordingly, each rolling member 2 has an H shaped cross-section. In order to hold the rolling members 2, kidney shaped bores 3 are formed in the same number as the rolling members 2 on the radially outer side of the rotary member 1 individually penetrating through the rotary member 1 in the thickness direction. Specifically, an opening width of the bore 3 in a radial direction of the rotary member 1 is wider than an outer diameter of the mass 2A of the rolling member 2 but smaller than an outer diameter of the disk 2B. Therefore, the mass 2A can be retained within the bore 3 by physical contact between the inner face of each disk 2B and each surface of the rotary member 1.

When the rotary member 1 is rotated, the rolling member 2 is centrifugally pushed onto an inner surface of a radially outer section of the bore 3. In order to ensure isochronism of the rolling member 2, the inner surface of a radially outer section of the bore 3 is formed in conformity with a specific orbit of a cycloid pendulum around a predetermined point outlying from the rotational center to serve as a raceway surface 4. Specifically, a center point of the raceway surface 4 in the circumferential direction is an equilibrium point P0 farthest from the center of the rotary member 1, and portion of both sides of the equilibrium point P0 gradually get closer to the center of the rotary member 1. At an initial phase of rotation, the rolling member 2 is centrifugally pushed onto the equilibrium point P0 of the raceway surface 4, and then oscillated around the equilibrium point P0 by torque pulses exerted to the rotary member 1. Number of oscillation "n" of the rolling member 2 along the raceway surface 4 can be calculated by the following formula:

$$n = (R/L)^{1/2};$$

where "R" is a distance between the center of rotary member 1 and a curvature center of the raceway surface 4, and "L" is a curvature radius of the raceway surface 4 (length of an arm of the cycloid pendulum).

According to the preferred examples, a cover 6 is attached to the rotary member 1 around the bore 3 to form a chamber 5, and the rolling member 2 is held therein liquid-tightly. As shown in FIG. 1, the chambers 5 are formed in the same number as the rolling member 2. Specifically, as illustrated in FIG. 2, a pair of covers 6 is attached to both sides of the rotary member 1 to form the chamber 5. According to the preferred example shown therein, each chamber 5 is individually formed into arcuate shape, but those chambers 5 may also be formed into other shapes such as an oval shape or an elliptical shape. In addition, a thickness of the chamber 5 thus formed in a thickness direction of the rotary member 1 is slightly wider than an axial length of the rolling member 2. That is, a play remains between each disk 2B and cover 6 on both sides of the rotary member 1 so that the rolling member 2 is allowed to move slightly in its axial direction. Consequently, an inner face of the disk 2B may come into contact with the rotary member 1 and an inner face of the cover 6.

In order to lubricate a contact site (or a friction site) between the oscillating rolling member 2 and the rotary member 1 or the inner face of the cover 6, lubrication oil 7 is encapsulated in the chamber 5. The amount of the lubrication oil 7 is adjusted in a manner not to excessively increase a resistance of the rolling member 2 to oscillate, and not to significantly change number of oscillation of the rolling member 2 per rotation or amplitude of oscillation. Specifically, when the rotary member 1 is rotated fast enough so that the rolling member 2 is centrifugally pushed onto the raceway surface 4, the lubrication oil 7 also centrifugally adheres to a radially outer section of an inner face of the chamber 5 to form an oil film 8. The oil film 8 is not especially shown in FIG. 1, but illustrated in FIG. 2. A thickness (or a depth) of the oil film 8 is governed by an amount of the lubrication oil 7 encapsulated in the chamber 5, and according to the preferred example, the amount of the lubrication oil 7 is adjusted in a manner such that the rolling member 2 (especially the disk 2B) centrifugally pushed onto the raceway surface 4 will not be brought into contact with the oil film 8 or will be brought into contact slightly with the oil film 8.

Given that a curvature of the chamber 5 at radially outside of the disk 2B of the rolling member 2 is not especially large, a thickness of the oil film 8 centrifugally formed thereon would be substantially constant. According to the preferred example, an amount of the lubrication oil 7 in the chamber 5 is determined in a manner such that a narrowest clearance between an outer circumferential face of the disk 2B of the rolling member 2 centrifugally pushed onto the raceway surface 4 and the inner circumferential face of the chamber 5 can be kept wider than the thickness of the oil film 8 thus formed so that the rolling member 2 is allowed to oscillate along the raceway surface 4 without contacting the oil film 8. If a curvature of the chamber 5 is locally large at the radially outer section, the thickness of the oil film 8 is partially thicker than the remaining portion. However, the amount of the lubrication oil 7 in the chamber 5 is adjusted in a manner such that the clearance between the disk 2B and the inner circumferential face of the chamber 5 can be kept to be wider than the thickest portion of the oil film 8. Thus, according to the preferred example, the rolling member 2 is allowed to be oscillated in response to the torque pulses without contacting the oil film 8 entirely along the raceway surface 4.

Alternatively, the amount of the lubrication oil 7 in the chamber 5 may also be adjusted in a manner such that the disk 2B of the rolling member 2 is slightly brought into contact with the oil film 8 during oscillation. In this case, however, the disk 2B will come into contact partially with the oil film 8 at some point of an oscillation path but will not come into contact with the oil film 8 throughout an entire path of oscillation. That is, even if the disk 2B of the rolling member 2 come into contact partially with the oil film 8 at some point of the oscillation, number of oscillation of the rolling member 2 per rotation or amplitude of oscillation will not be changed.

Thus, the amount of the lubrication oil 7 is determined in the above-explained manner, and the oil film 8 is centrifugally formed on the radially outer section of the inner face of the chamber 5 when the rotary member 1 is rotated fast enough. On the other hand, a radial position of the rolling member 2 in the rotary member 1 is governed by a radial position of the raceway surface 4 when it is centrifugally pushed onto the raceway surface 4. According to the preferred example, therefore, the radial position of the rolling member 2 or the raceway surface 4 in the rotary member 1 are also adjusted to adjust an oscillating path of the rolling member in a manner such that the disk 2B of the rolling member 2 will not come into contact with the oil film 8 throughout an entire path of oscillation.

In the torsional vibration damping device of the present invention, when the rotary member 1 stops, the lubrication oil 7 falls to a lowest level in each chamber 5. In this situation, almost all amount of the lubrication oil 7 is concentrated to the lowest level in each chamber 5, and in the chamber 5 situated at the lowest position in FIG. 1, the rolling member 2 held therein is partially immersed in the lubrication oil 7. Consequently, an oil film is also formed on the rolling member 2.

Figure 4:
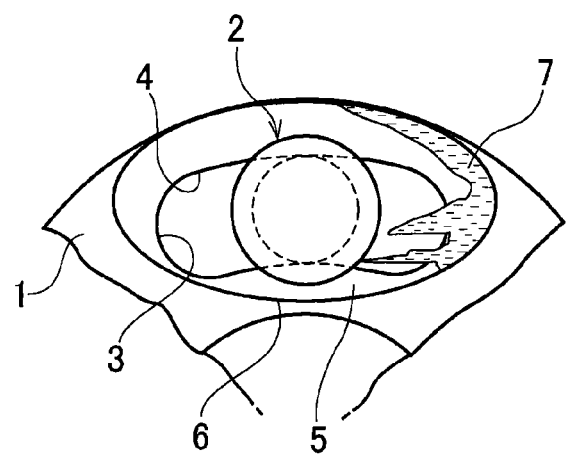
FIG. 4 is a view schematically showing lubrication oil flowing and scattering in a chamber.

Then, when the rotary member 1 starts rotating, the lubrication oil 7 in each chamber 5 is inertially agitated while flowing in a counter direction to a rotational direction of the rotary member 1 as illustrated in FIG. 4. In this situation, the lubrication oil 7 adheres to the rolling member 2, the raceway surface 4 and the inner face of the cover 5, and consequently the oil films are formed thereon. Therefore, a contact site between the mass 2A and the raceway surface 4, a contact site between each inner face of the disk 2B and the each face of the rotary member 2, a contact site between the outer face of the disk 2B and the inner face of the cover 2 are lubricated so that friction at those contact sites and can be reduced to prevent the vibration damping device from being damaged. In addition, number of oscillation of the rolling member 2 per rotation will not be changed frictionally. Here, such agitation of the lubrication oil 7 is also caused when the rotational speed of the rotary member 1 or the centrifugal force is changed immediately, and when the rotation of the rotary member 1 is stopped suddenly.

Figure 3:
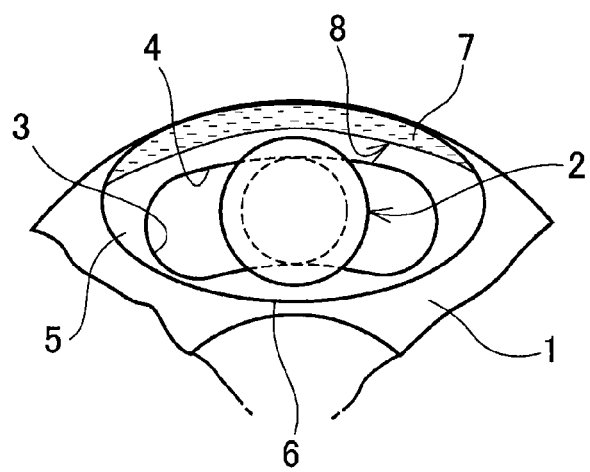
FIG. 3 is a partial view showing another configuration of a cover.

As described, when the rotational speed of the rotary member 1 is sufficiently increased to exert the centrifugal force, the oil lubrication oil 7 adheres to the inner face of radially outer section of the chamber 5, and the mass 2A of the rolling member 2 is pushed onto the raceway surface 4. In this situation, the oil film 8 is formed on the inner face of the chamber 5, and FIG. 3 illustrates an example of the oil film 8 having a uniform thickness. Since the amount of the lubrication oil 7 in the chamber 5 and the radial position of the rolling member 2 (especially the disk 2B) are determined in the above-explained manner, the rolling member 2 can be prevented from being contacted with the oil film 8 over the entire course of oscillation. When the torque pulse is exerted on the rotary element 1, the rolling member 2 is oscillated around the equilibrium point P0. In this situation, however, the number of oscillation of the rolling member 2 per rotation will not be changed by the resistance caused by the lubrication oil 7 to ensure desired vibration damping characteristics. In addition, since friction and abrasion at the contact sites are reduced by the oil film, the vibration damping characteristics can be maintained over the long period of time so that the vibration damping device can be prevented from being damaged over the long period of time. Further, since the rolling member 2 is not brought into contact with the lubrication oil 7 over the entire course of oscillation, the vibration damping device can be designed without taking account of viscosity of the lubrication oil 7 so that the vibration damping characteristics can be tuned easily and precisely.

Figure 5:
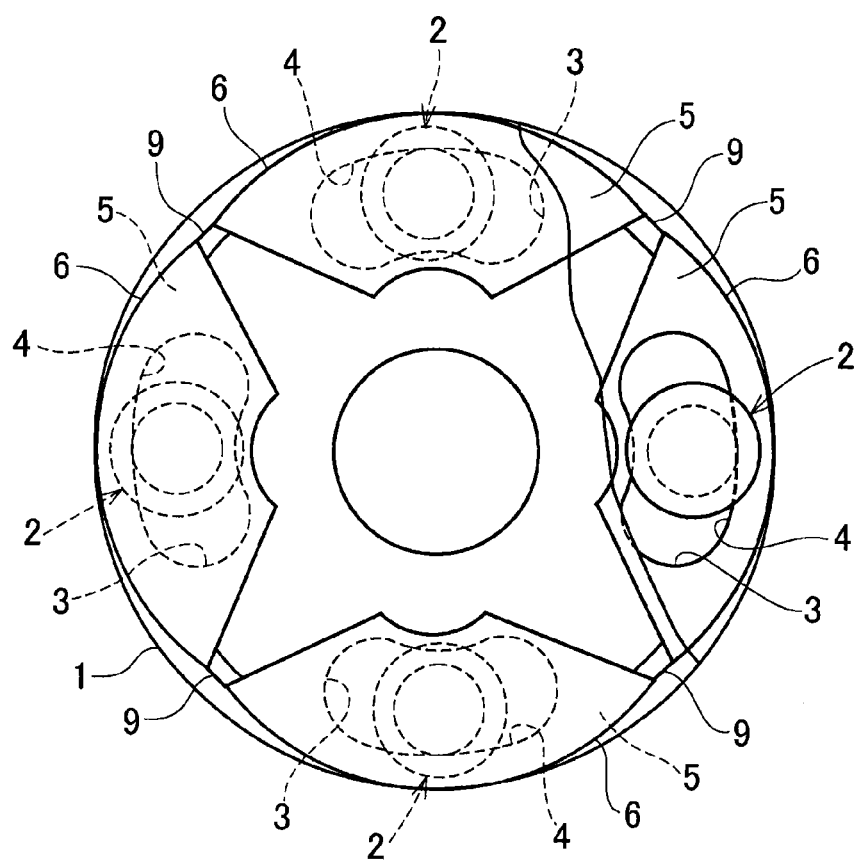
FIG. 5 is a front view schematically showing an example in which a connection passage is formed to provide a connection between chambers.

Thus, a plurality of rolling members 2 and chambers 5 are arranged according to the preferred example. In the vibration damping device thus structured, it is preferable to equalize an amount of the lubrication oil 7 in each chamber 5 during rotation so as to equalize a mass of each chamber 5. To this end, according to the example shown in FIG. 5, a connection passage 9 is formed to provide a connection between the adjoining chambers 5 so as to deliver the lubrication oil 7 equally to those chambers 5. Preferably, the connection passage 9 is formed to connect radially outer portions of the adjoining chambers 5.

The centrifugal force resulting from rotation of the rotary member 1 is exerted to the inner face of radially outer section of the chamber 5 homogeneously in the circumferential direction. That is, given that a distance between a center of the rotary member 1 and the inner face of the chamber 5 is entirely constant in the circumferential direction, the lubrication oil 7 would spread homogeneously over the inner face of radially outer section of the chamber 5. In this situation, if the amounts of the lubrication oil 7 in the chambers 5 connected through the connection passage 9 are different from each other, surplus of the lubrication oil 7 of one of the chamber 5 will flow into the other chamber 5 through the connection passage 9 to compensate for deficiency of the lubrication oil 7. Consequently, amounts of the lubrication oil 7 in those chambers 5 are equalized to each other.

The chamber 5 may also be formed integrally to hold the plurality of the rolling member 2. According to the example illustrated in FIG. 6, the chamber 5 is formed by closing the rotary member 1 liquid-tightly by a pair of covers 6A having a bottom that is diametrically identical to the rotary member 1. In this case, a curvature of an inner circumferential face of the chamber 5 is constant everywhere around the rotational center of the rotary member 1 but the curvature of the raceway surface 4 is larger than that of the chamber 5. Accordingly, the rolling member 2 is isolated away from the inner circumferential face of the chamber 5 with a distance from the equilibrium point P0 of the raceway surface 4. In this case, when the rotary member 1 is rotated, the lubrication oil 7 centrifugally adheres to the inner circumferential face of the chamber 5 to form an annular oil film 8 around the center of the rotary member 1 as illustrated in FIG. 7(*a*). In this situation, the rolling member 2 centrifugally pushed onto the raceway surface 4 is oscillated by the torque pulses exerted to the rotary member 1 without come into contact with the oil film 8 or while being brought into contact slightly with the oil film 8 within a limited range around the equilibrium point P0. Therefore, the rolling member 2 is allowed to oscillate at a desired frequency per rotation of the rotary member 1 to counteract to the torque pulses.

Figure 7C:
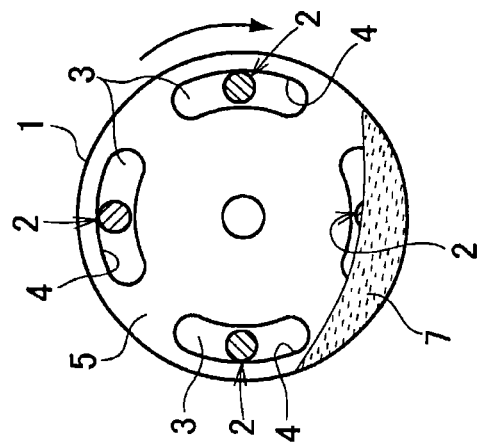
FIG. 7 is a schematic view for explaining behaviors of lubrication oil in the integrated chamber.
Figure 7B:
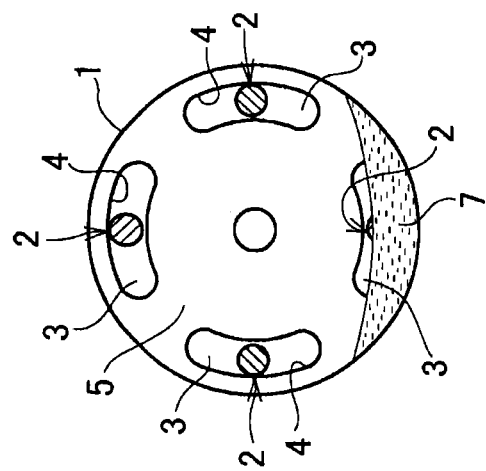

In contrast, when the rotary member 1 stops, the lubrication oil 7 is concentrated in the bottom of the chamber 5 as illustrated in FIG. 7(b). In this situation, the rolling member 2 and the raceway surface 4 situated at the lowest position are immersed into the lubrication oil 7. Then, when the rotary member 1 starts rotating, the lubrication oil 7 is slightly lifted upwardly in the rotational direction of the rotary member 1 as illustrated in FIG. 7(c). However, before the rotational speed of the rotary member 1 is increased to exert sufficient centrifugal force, the oil film 8 has not yet been formed and still concentrated in the bottom of the chamber 5. In this situation, therefore, each rolling member 2, raceway surface 4, and inner surface of radially outer section of the cover 6A passes through the lubrication oil 7 at the bottom of the chamber 5 in sequence, and consequently the lubrication oil 7 adheres to those elements to form an oil film thereon. As described, the lubrication oil 7 is agitated by the torque pulses and an abrupt reduction in the rotational speed, and consequently the lubrication oil 7 falls onto the rolling members 2, the raceway surfaces 4, and inner surfaces of radially outer section of the covers 6A to lubricate those elements as the foregoing examples in which a plurality of chamber 5 is formed separately.

Figure 6:
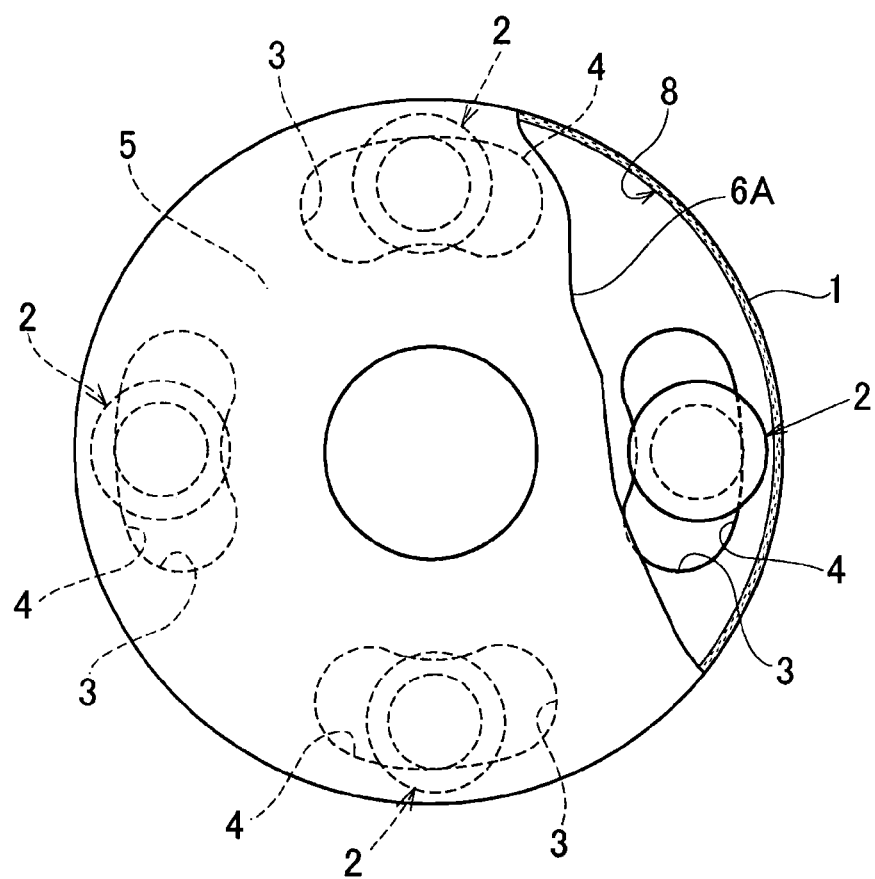
FIG. 6 is a partially fractured front view showing an example of an integrated chamber holding all rolling members.
Figure 7A:
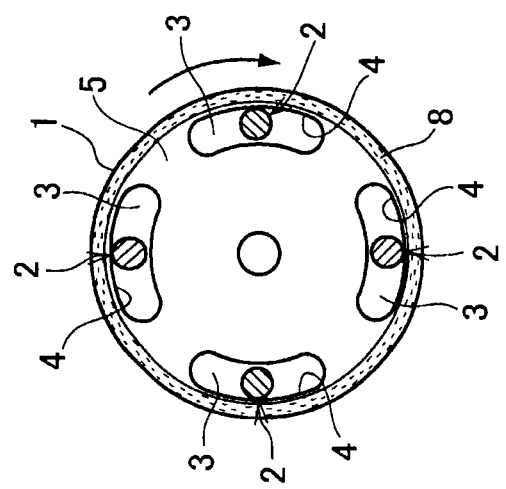

Thus, in any of the examples illustrated in FIGS. 6 and 7, the contact sites with the rolling member 2 can be lubricated certainly. According to those examples, during rotating the rotary member 1, the lubrication oil 7 is centrifugally migrated to form the oil film 8 in radially outer side of the rolling member 2 so that the rolling member 2 can be oscillated without contacting to the oil film 8 or while slightly contacting to the oil film 8 within the limited range. Therefore, desired vibration damping characteristics can be maintained.

Figure 8:
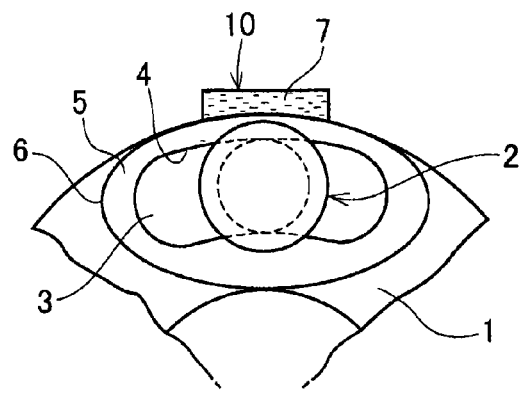
FIG. 8 is a partial view showing one example of the oil reservoir.

A vibration damping ability of the vibration damping device can be enhanced by increasing an inertial torque of the rolling member 2. For this purpose, it is preferable to situate the rolling member 2 at the radially outermost portion of the rotary member 1. However, the radial position of the rolling member 2 is restricted by the oil film 8 formed on the outer circumferential sides of the rolling member 2. Therefore, in order to reduce the thickness (or depth) of the oil film 8 as much as possible, an oil reservoir 10 may be arranged individually on the radially outer side of each chamber 5 while opening thereto as illustrated in FIG. 8. In this case, a capacity of the oil reservoir 10 may be determined irrespective of a total amount of the lubrication oil 7 held in the chamber 5 and may be adjusted according to need. In any case, the lubrication oil 7 forming the oil film 8 along the inner surface of the outer circumferential section of the chamber 5 partially flows into the reservoir 10 so as not to be involved in forming the oil film 8. Consequently, the thickness (or depth) of the oil film 8 can be reduced to be thinner than that in the foregoing examples. As a result of thus arranging the oil reservoir 10, the rolling member 2 can be displaced outwardly in a reduction amount of the thickness of the oil film 8 so that the vibration damping ability of the damping device can be enhanced.

Instead, the oil reservoir 10 may also be formed by forming a through hole penetrating through the rotary member 1 at the radially outer side of the railway surface 4 in a thickness direction. In this case, the lubrication oil 7 forming the oil film 8 along the inner surface of the outer circumferential section of the chamber 5 also partially flows into the reservoir 10 thus formed so that the thickness of the oil film 8 can be reduced. Accordingly, the rolling member 2 may also be displaced outwardly in a reduction amount of the thickness of the oil film 8.

Figure 9A:
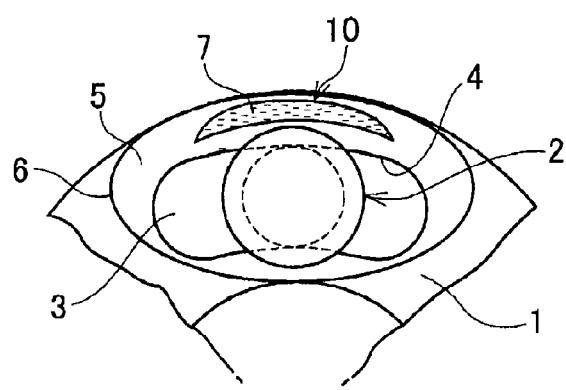
FIG. 9 is a partial view showing another example of the oil reservoir.
Figure 9B:
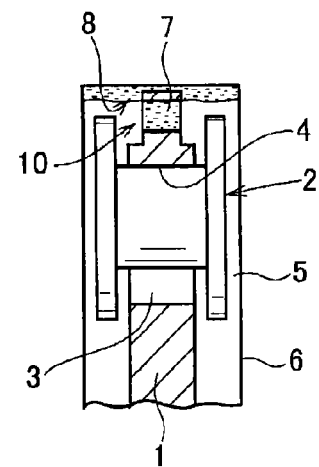
Figure 10:
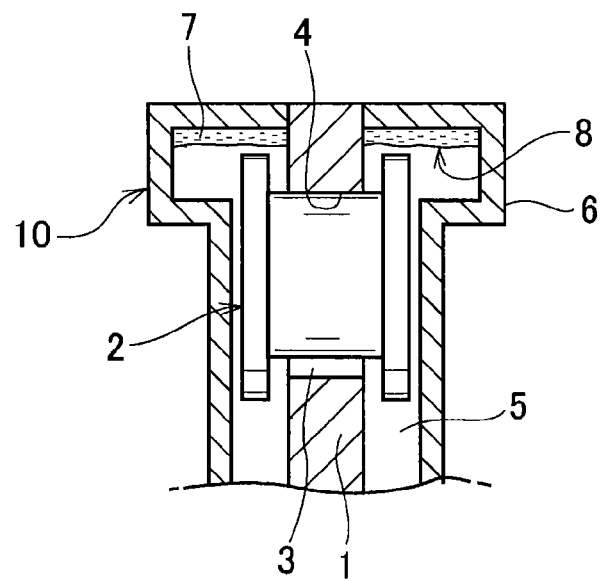
FIG. 10 is a partial view showing still another example of an oil reservoir.

In addition, the oil reservoir 10 may also be formed by expanding the radially outer portion of the chamber 5 to protrude in both axial directions of the rotary member 1. In other words, the oil reservoir 10 may also be formed by increasing thickness of the chamber 5. In this case, as the examples shown in FIG. 9, the lubrication oil 7 forming the oil film 8 along the inner surface of the outer circumferential section of the chamber 5 also partially flows into the reservoir 10 thus formed so that the thickness of the oil film 8 can be reduced. Accordingly, the rolling member 2 may also be displaced outwardly in a reduction amount of the thickness of the oil film 8.

Figure 11:
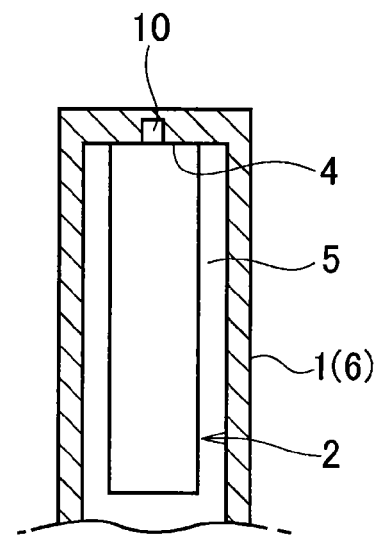
FIG. 11 is a partial view showing another example of the rolling member.

As shown in FIG. 11, the rolling member 2 may also be formed into a simple disk or a short column instead of the rolling member 2 having an H shaped cross-section. In this case, the inner face of radially outer section of the chamber 5 serves as the raceway surface 4, and the oil reservoir 10 may be formed by forming a groove on the raceway surface 4 in the circumferential direction.

Figure 12:
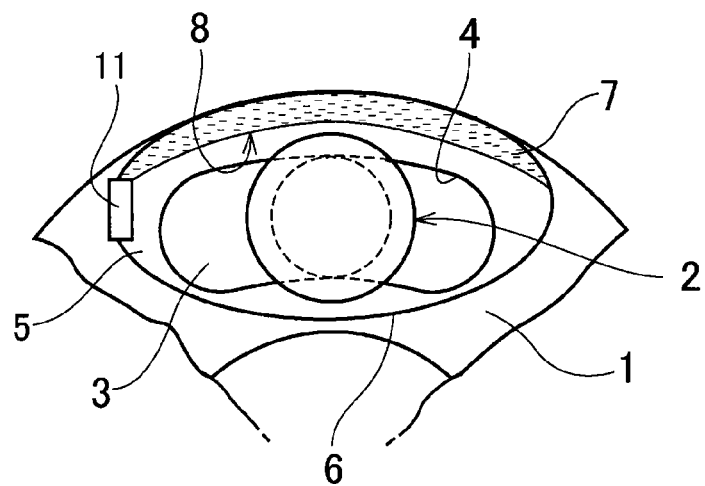
FIG. 12 is a partial view showing an example of using a magnet as a foreign matter capturing member arranged in the separated chamber.
Figure 13:
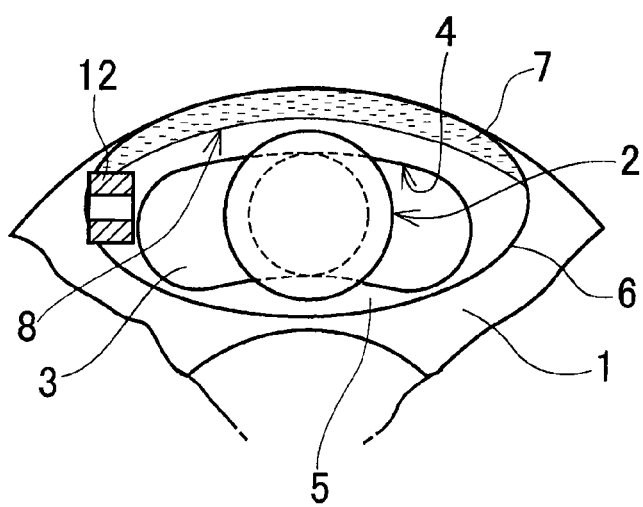
FIG. 13 is a partial view showing an example of using a strainer as the foreign matter capturing member in the separated chamber instead of the magnet.

In the vibration damping device, metal powder resulting from metal processing may remain in the chamber 5, and small burrs formed in the chamber 5 may come out in the beginning of use. Those foreign matters may be mixed into the lubrication oil 7 flowing or scattering randomly and delivered to the contact sites with the rolling member 2 to cause abrasion. In order to prevent such disadvantage, a foreign matter capturing member may be arranged in the chamber 5. For example, according to the example shown in FIG. 12, a magnet 11 is disposed in the chamber 5 at a site not to block the oscillation of the rolling member 2 to capture magnetic metal powder. Alternatively, according to the example shown in FIG. 13, a strainer 12 is disposed as the foreign matter capturing member in the chamber 5 at the site not to block the oscillation of the rolling member 2 instead of the magnet 11. Specifically, the strainer 12 is made of a porous material whose pore size is smaller than a diameter of the foreign matter so that the foreign matter contained in the lubrication oil 7 flowing therethrough can be captured by the strainer 12.

Figure 14:
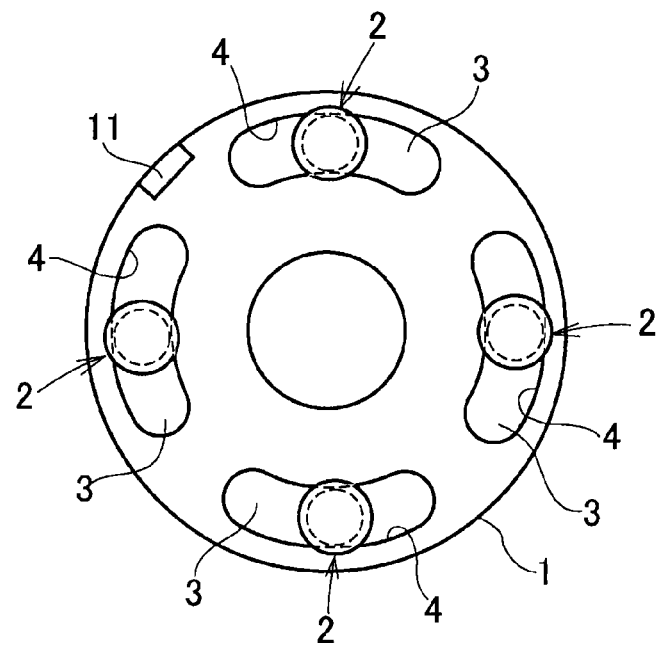
FIG. 14 is a partial view showing an example of using the magnet as the foreign matter capturing member in the integrated chamber holding all rolling members.
Figure 15:
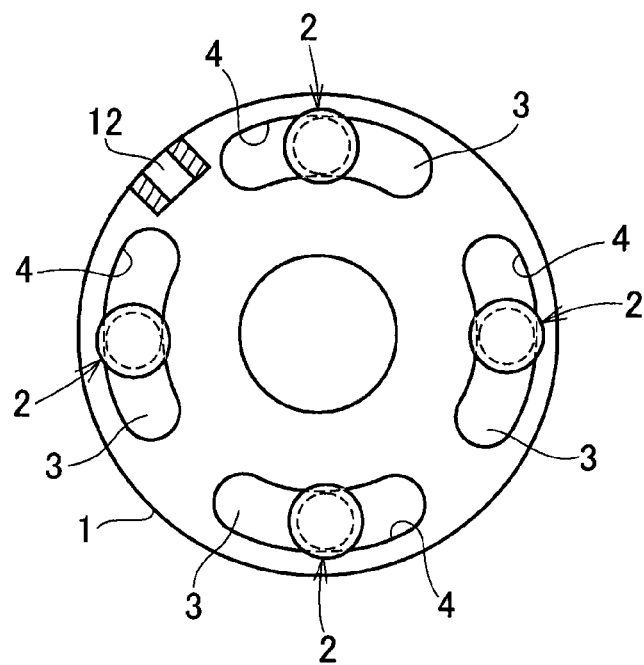
FIG. 15 is a partial view showing an example of using the strainer as the foreign matter capturing member in the integrated chamber holding all rolling member instead of the magnet.

Given that the chamber 5 is individually arranged for each rolling member 2, the foreign matter capturing member is arranged for each chamber 5. In contrast, given that chamber 5 is formed integrally to hold a plurality of the rolling member 2 therein, it is not necessary to arrange the foreign matter capturing member for each the rolling member 2 as shown in FIGS. 14 and 15. In the example illustrated in FIG. 4, the magnet 11 is disposed between predetermined adjoining bores 3. Alternatively, in the example illustrated in FIG. 5, the strainer 12 is disposed between the predetermined adjoining bores 3 instead of the magnet 11. In order to effectively bring the lubrication oil 7 into contact to the magnet 11 or the strainer 12, the magnet 11 or the strainer 12 is preferably disposed on the inner circumferential face of the chamber 5 on which the oil film 8 is formed.

Thus, the foreign matter capturing member such as the magnet 11 and the strainer 12 may be disposed inside of the chamber 5 to trap the foreign matters contained in the lubrication oil 7 before delivered to the contact sites with the rolling member 2. Accordingly, the contact site between the raceway surface 4 and the rolling member 2 oscillating thereon can be prevented from being damaged by the foreign matter.

As mentioned above, the lubrication oil 7 is encapsulated in the chamber 5 to lubricate between the rolling member 2 and the raceway surface 4 or the inner face of the chamber 5, and the lubrication oil 7 is agitated randomly by a change in a rotational speed of the rotary member 1. That is, an amount of lubrication oil 7 can be reduced by concentrating the lubrication oil 7 flowing or scattering randomly to the lubrication site. For this purpose, the torsional damping device of the present invention may be provided with a guide member 13. In the example illustrated in FIG. 16, a pair of semicircular guide members 13 is disposed on the each lateral end of the bore 3 to enclose the rolling member 2. Specifically, a curvature radius of the guide members 13 is larger than that of a radius of the rolling member 2, and one end thereof is situated in the vicinity of the inner face of the chamber 5. Here, the guide members 13 thus structured may be arranged not only in the chamber 5 formed to hold the rolling member 2 separately but also in the chamber 5 formed to hold the plurality of rolling members 2.

Figure 16:
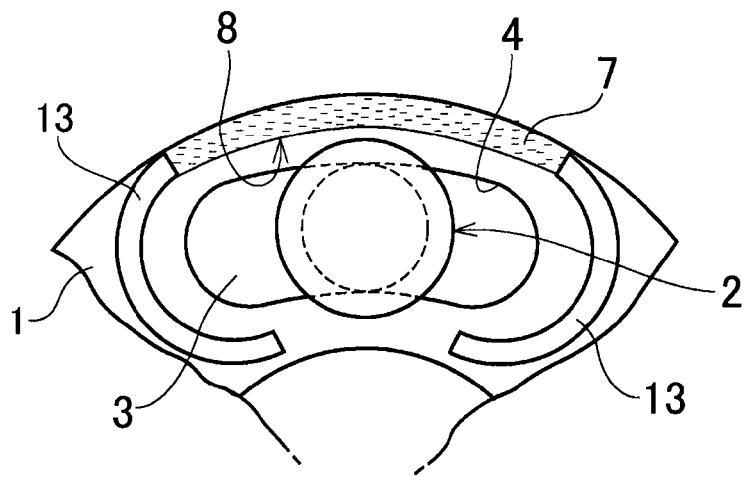
FIG. 16 is a partial view showing an example of the guide member guiding lubrication oil mainly to the rolling members.
Figure 17:
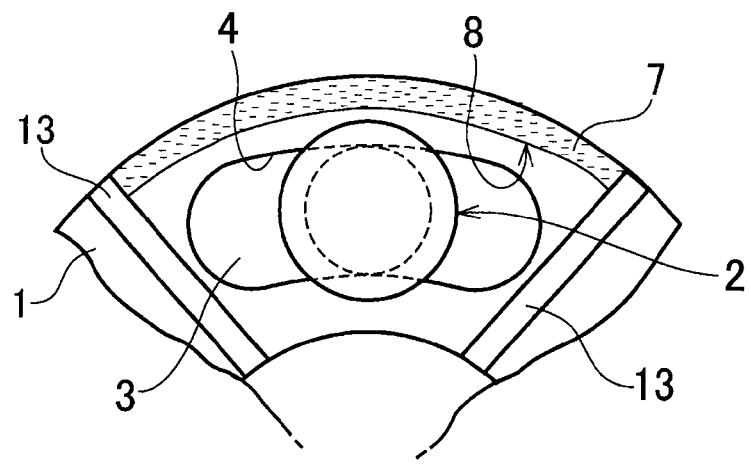
FIG. 17 is a partial view showing another example of the guide member guiding lubrication oil mainly to the rolling members.
Figure 18:
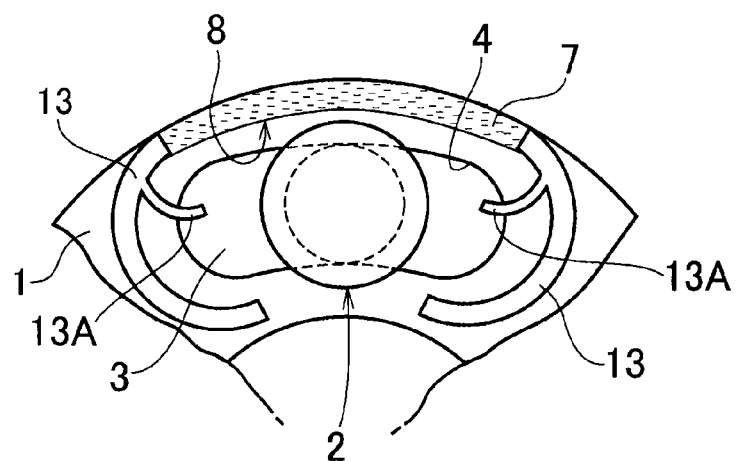
FIG. 18 is a partial view schematically showing an example of the sub-guide member.

Alternatively, as shown in FIG. 17, a flat plate may be employed as the guide member 13 instead of the semicircular guide shown in FIG. 16. Optionally, as shown in FIG. 18, a semicircular sub-guide member 13A may be formed on an inner face of the semicircular guide to guide the lubrication oil 7 toward the raceway surface 4. Here, the guide member 13 and the sub-guide member 13A may be disposed on the side face of the rotary member 1 or the inner face of the cover 6, or may be engraved on the inner face of the cover 6.

According to the examples illustrated in FIGS. 16 to 18, the lubrication oil 7 forming the oil film 8 is guided by the guide member 13 and the sub-guide member 13A to circumferentially flow toward the rolling member 2 and the raceway surface 4 when the rotational speed of the rotary member 1 is changed. The lubrication oil 7 falling from the inner face of the chamber 5 due to speed reduction of the rotary member 1 drops is also guided by the guide member 13 and the sub-guide member 13A toward the rolling member 2 and the raceway surface 4. Consequently, the lubrication oil 7 is applied efficiently to the lubrication sites such as the rolling member 2 and the raceway surface 4 so that a required amount of the lubrication oil 7 can be reduced. Consequently, the thickness of the oil film 8 is reduced so that the rolling member 2 can be displaced radially outwardly to enhance the vibration damping characteristics. In addition, the weight of the entire damping device can be reduced.

The present invention is not limited to the aforementioned examples, and the inner face of the radially outer section of the chamber 5 may be modified arbitrarily. For example, a portion of the inner circumferential face of the rolling member 2 facing to the disk 2B may be depressed to be isolated the oil film 8 away from the disk 2B.

REFERENCE SIGNS LIST

1: rotary member; 2: rolling member; 2A: mass; 2B: disk; 3: bore; 4: raceway surface; P0: equilibrium point; 5: chamber; 6: cover; 7: lubrication oil; 8: oil film; 9: connection passage; 10: oil reservoir; 11: magnet; 12: strainer; 13: guide member; 13A: sub-guide member.

The invention claimed is:

1. A torsional vibration damping device, comprising:
a rotary member that is rotated by a torque;
at least one inertial mass that is arranged on a radially outer portion of the rotary member while being allowed to be oscillated by torque pulses in a rotational direction of the rotary member;
a raceway surface that is formed in the rotary member to which the at least one inertial mass is centrifugally pushed while being allowed to be oscillated by the torque pulses;
at least one chamber that is formed on the rotary member to hold the at least one inertial mass and the raceway surface in a manner to allow the at least one inertial mass to oscillate in the rotational direction of the rotary member; and
a lubrication oil encapsulated in the at least one chamber;
wherein a radially outer section of an inner face of the at least one chamber on which an oil film is formed centrifugally is situated at a radially outer side of the raceway surface;
wherein an amount of the lubrication oil is adjusted in a manner such that during oscillation the inertial mass oscillating along the raceway surface will not be brought into contact with the oil film of the lubrication oil centrifugally adhering to the radially outer section of the inner face of the at least one chamber.

2. The torsional vibration damping device as claimed in claim 1, wherein an oil reservoir into which the lubrication oil is introduced is arranged on a radially outer side of the at least one chamber while opening toward the at least one chamber.

3. The torsional vibration damping device as claimed in claim 2, wherein the oil reservoir is arranged on a radially outer side of the rotary member in the chamber.

4. The torsional vibration damping device as claimed in claim 2, wherein the oil reservoir is formed by projecting an outer circumferential portion of the at least one chamber in an axial direction of the rotary member.

5. The torsional vibration damping device as claimed in claim 1, further comprising:
a foreign matter capturing member adapted to capture foreign matter contained in the lubrication oil that is arranged at a site where the lubrication oil comes into contact therewith.

6. The torsional vibration damping device as claimed in claim 5, wherein the foreign matter capturing member includes a magnet for capturing magnetic metal powder.

7. The torsional vibration damping device as claimed in claim 5, wherein the foreign matter capturing member includes a strainer adapted to capture solid foreign matter contained in the lubrication oil flowing therethrough.

8. The torsional vibration damping device as claimed in claim 1,
wherein the at least one inertial mass includes a rolling member oscillated by the torque pulses, and
further comprising a guide member that is arranged in the at least one chamber to guide the lubrication oil migrating radially inwardly from the radially outer section of the at least one chamber to the raceway surface or to the rolling member.

9. The torsional vibration damping device as claimed in claim 1, wherein
the at least one chamber is comprised of a plurality of chambers,
wherein the at least one inertial mass is comprised of a plurality of the inertial masses arranged in the rotary member at predetermined intervals in a circumferential direction, wherein each of the plurality of chambers is individually arranged to hold a respective one of the plurality of inertial masses, and further comprising a connection passage connecting adjoining chambers to allow the lubrication oil flowing between the adjoining chambers.

10. The torsional vibration damping device as claimed in claim 1, wherein a plurality of the inertial masses are arranged in the rotary member at predetermined intervals in a circumferential direction, and wherein the at least one chamber is comprised of a plurality of chambers formed in a manner to respectively hold the plurality of the inertial masses.

11. A torsional vibration damping device, comprising:

a rotary member that is rotated by a torque;

an inertial mass that is arranged on a radially outer portion of the rotary member while being allowed to be oscillated by torque pulses in a rotational direction of the rotary member;

a raceway surface that is formed in the rotary member to which the inertial mass is centrifugally pushed while being allowed to be oscillated by the torque pulses;

at least one chamber that is formed on the rotary member to hold the inertial mass and the raceway surface in a manner to allow the inertial mass to oscillate in the rotational direction of the rotary member; and a lubrication oil encapsulated in the at least one chamber;

wherein a radially outer section of an inner face of the at least one chamber on which an oil film is formed centrifugally is situated at a radially outer side of the raceway surface;

wherein an oscillating path of the inertial mass is adjusted in a manner such that during oscillation the inertial mass oscillated by one of the torque pulses along the raceway surface will not come into contact with the oil film of the lubrication oil centrifugally adhering to the radially outer section of the inner face of the at least one chamber throughout an entirety of the oscillation path.

* * * * *